March 16, 1943.   S. E. HILBLOM   2,314,214
SWEEP RAKE
Filed July 21, 1941   2 Sheets-Sheet 1
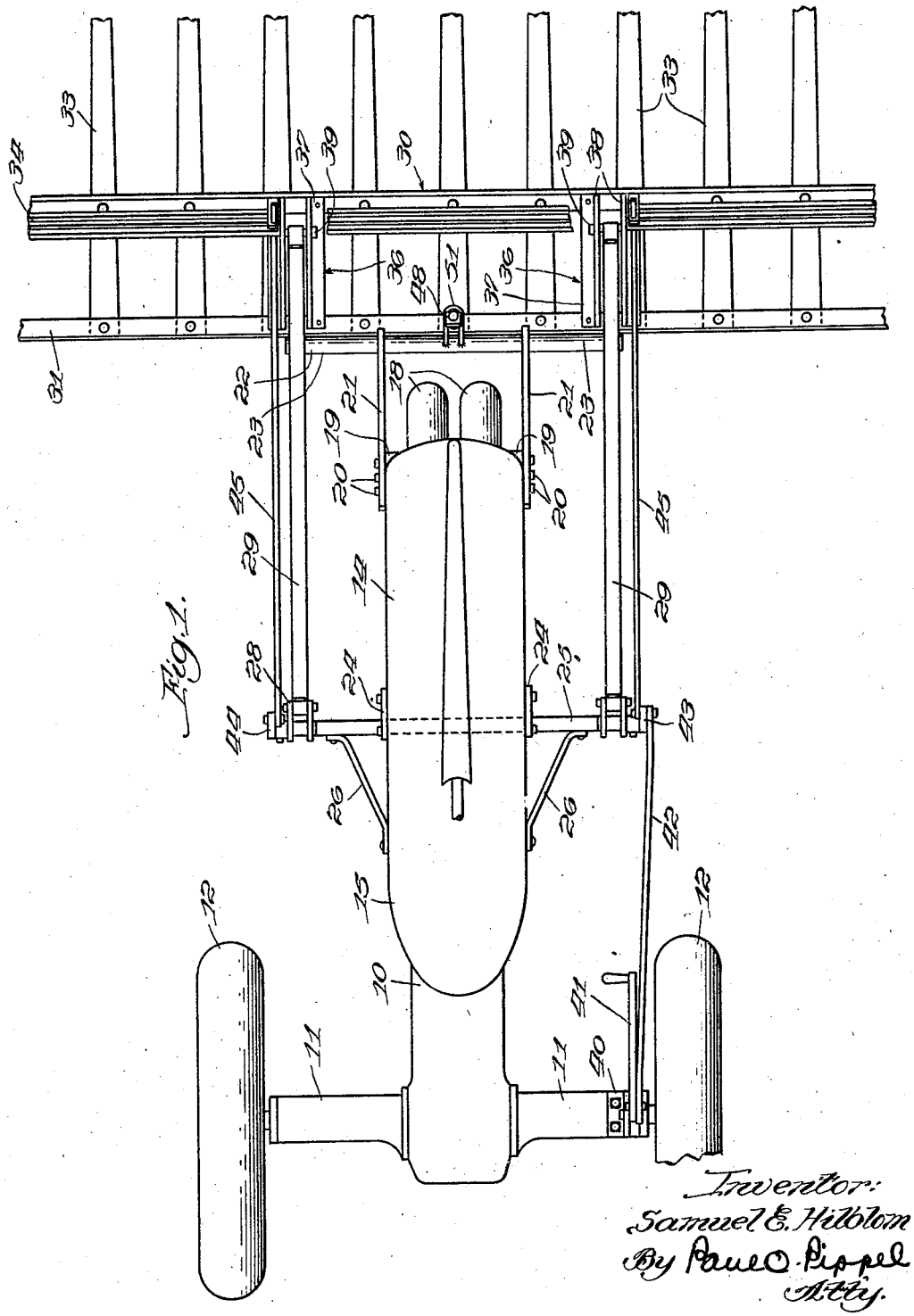
Inventor:
Samuel E. Hilblom
By Paul O. Pippel
Atty.

March 16, 1943. S. E. HILBLOM 2,314,214
SWEEP RAKE
Filed July 21, 1941 2 Sheets-Sheet 2
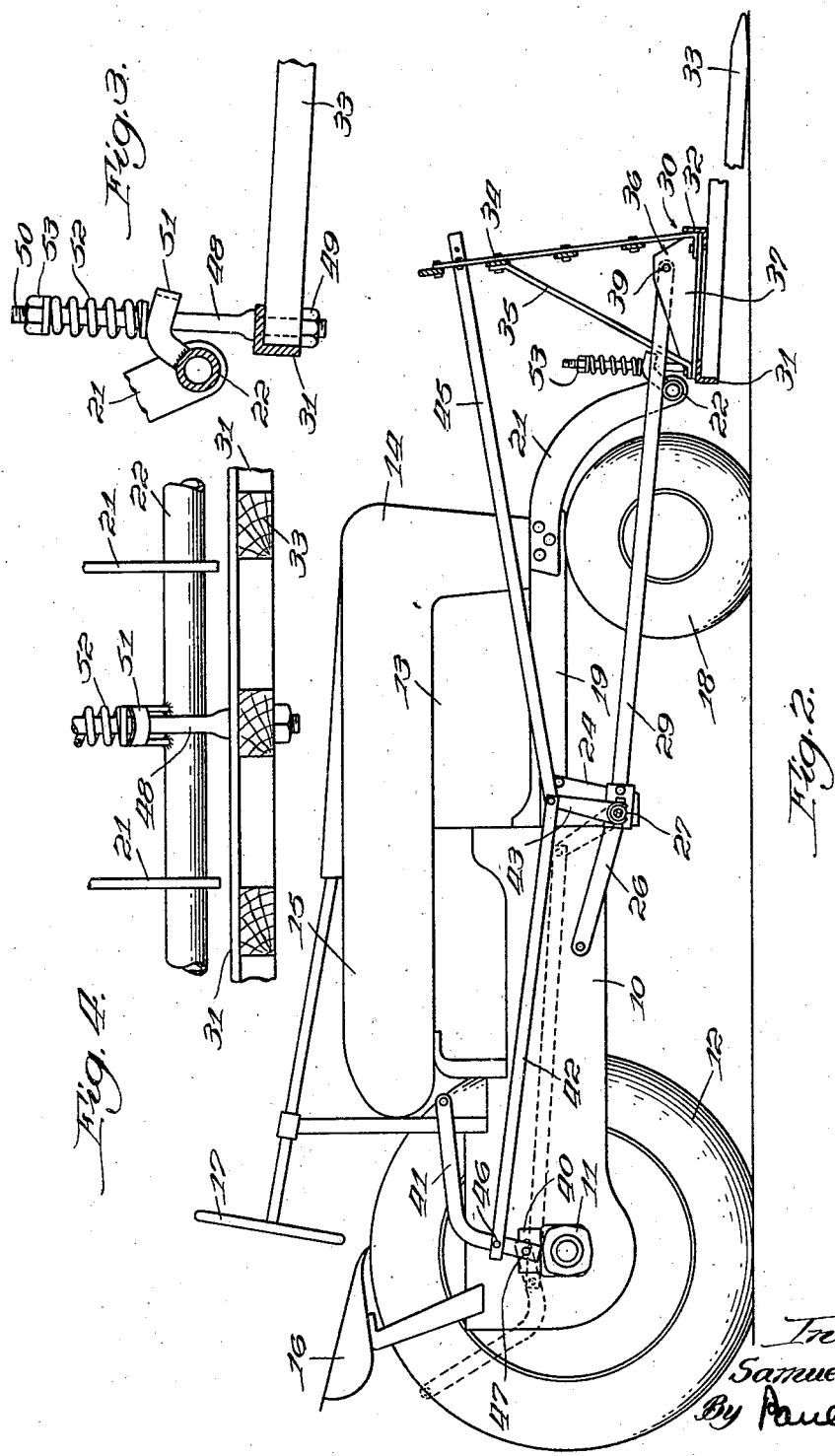
Inventor:
Samuel E. Hilblom.
By Paul O. Pippel
Atty.

Patented Mar. 16, 1943

2,314,214

UNITED STATES PATENT OFFICE 2,314,214

SWEEP RAKE

Samuel E. Hilblom, Chicago, Ill., assignor to International Harvester Company, a corporation of New Jersey Application July 21, 1941, Serial No. 403,258

12 Claims. (Cl. 56—27)

This invention relates to a sweep rake and, more particularly, to a vehicle-mounted sweep rake of the type carried at the forward end of a tractor or similar vehicle.

A vehicle-mounted sweep rake of familiar construction comprises generally a tractor having a longitudinal body ahead of which is disposed a rake head including a plurality of forwardly extending rake teeth. The rake head is mounted on the tractor for movement vertically with respect to the tractor and, in its lower position, the rake teeth engage the ground. Lifting and lowering means are provided on the tractor for raising the rake head from ground-engaging position to a raised or transport position.

One of the problems in sweep rake construction is created by the necessity of the supporting of the rake ahead of the front wheels of the vehicle, in which case the weight of the loaded rake head is quite substantial, and which places great stresses on the forward end of a tractor of the tricycle type.

Another problem arises in the provision of means for permitting the rake head to have vertical movement with respect to the tractor as the tractor and rake teeth follow varying ground contours. This problem is accentuated by the peculiarities of the lifting and lowering means for raising and lowering the rake head. In prior constructions the lifting and lowering means was locked in a position corresponding to the ground-engaging position of the rake head. In those circumstances, the rake head did not have the desired free floating, vertical movement within limits to accommodate irregularities in the ground surface.

In another aspect, prior constructions failed to provide adequate means for applying pressure to the rake head so that the teeth were yieldably urged into contact with the ground.

The principal object of the present invention is to provide an improved vehicle-mounted sweep rake and particularly to provide improved means for mounting the rake construction on the vehicle.

An important object is to provide lifting and lowering means for the rake head which will not interfere with a desirable free vertical movement of the rake head with respect to the vehicle.

A further important object is the provision of yieldable means for imparting pressure to the rake head to urge the rake teeth into contact with the ground.

Another object is to construct the lifting and lowering mechanism so that it has means for locking the rake head only in raised position, so that the rake head is unrestrained in ground-engaging position against vertical movement as it follows varying ground contour.

Still another object is to construct the yieldable means in a manner enabling said means to operate on the rake head independently of any connection with the lifting and lowering means, so that the yieldable means is the only means restraining vertical movement of the rake head with respect to the vehicle.

Another object is to provide means for resisting relative transverse movement between the rake head and the vehicle, and particularly to locate this means centrally of the vehicle and rake head construction so that only a single means is necessary.

These and other objects and desirable features of the invention will appear in greater detail in the following description of the invention taken in conjunction with the accompanying sheets of drawings which illustrate a preferred embodiment of the invention.

In the drawings,

Figure 1 is a plan view of a tractor-mounted sweep rake constructed according to the invention;

Figure 2 is a side elevational view of the same;

Figure 3 is an enlarged view of the yieldable or pressure means as viewed from the side; and, Figure 4 is an illustration of the same parts as viewed from a position looking rearwardly from in front of the tractor.

The vehicle chosen for the purposes of illustration is a tractor of the tricycle type having a longitudinal main frame or body 10 including a pair of oppositely extending axle housings 11, each of which journals an axle for driving a large drive wheel 12. The forward portion of the body includes the usual engine 13 enclosed by a hood structure 14, behind which is located a fuel tank 15. A rear portion of the body carries an operator's station 16 immediately ahead of which is located a steering wheel 17 which operates steering mechanism, not shown, for steering a front wheeled truck 18, which supports the front end of the body 10.

The front portion of the body 10 includes a pair of longitudinally running, transversely spaced side frame members 19. To each of the frame members 19 is rigidly secured by bolts 20 a forwardly extending frame bar 21. These bars curve forwardly and downwardly in the form of goose-necks and rigidly carry at their lower, forward ends a transverse member in the form of a tubular bar 22. As best shown in Figure 2, this bar is located substantially in alinement with and preferably slightly below the transverse axis of the wheels of the front truck 18. Opposite outer end portions of the bar or member 22 extend laterally beyond the sides of the tractor, as at 23. An intermediate portion of the body 10 carries a pair of laterally spaced brackets 24 which rigidly carry a transverse pipe 26. Bracing members 26 additionally support the pipe 25 on the tractor body 10. The pipe 25 serves to journal a transverse rock-shaft 27, also preferably in the form of a tubular member. This rock-shaft comprises part of the lifting and lowering means to be hereinafter described.

Each end of the rock-shaft 27 has journaled thereon a bracket 28. Each bracket is pivotally connected to a forwardly extending frame member or push-bar 29 (see Figure 1). Each bar extends forwardly, paralleling the tractor body 10, and extends above and forwardly beyond the respective extending portion 23 of the transverse front member 22. These bars serve to support a rake head, generally indicated at 30. The rake head comprises a pair of transversely extending, longitudinally spaced members 31 and 32, to which is rigidly secured a plurality of forwardly extending rake teeth 33. The forward member 32 also serves to carry an upstanding rack or frame structure 34 suitably braced by braces 35 which extend from the upper portion of said structure downwardly to the rear transverse frame member 31. At each side of the central portion of the rake head the bars 31 and 32 carry a pivot means, generally indicated at 36, for pivotally connecting the rake head and the pusher bars 29. Each of the pivot means 36 comprises a pair of laterally spaced, longitudinally extending bracket members 37, each of which has an upstanding portion 38. The forward end of a pusher bar 29 fits loosely between the upstanding portions 38 of the brackets 37. A pin 39 pivotally connects the brackets to the pusher bar. Both brackets and both pusher bars are similarly connected. This means serves to connect the pusher bars 29 and rake head 30 to mount the rake head tiltably on the bars 29, so that the rake head may have vertical movement relative to the pusher bars and tractor. As best shown in Figure 2, the pusher bars, which are also mounted for vertical movement with respect to the tractor, rest on and are supported by the laterally extending portions 23 of the front transverse supporting member 22. In this manner the rear end of the rake head is disposed above the ground, while the forward ends of the rake teeth 33 are engaged with the ground.

One of the rear axle housings 11 carries a pivot bracket 40, which pivotally carries a lever 41 disposed proximately to the operator's station 16. To this lever is pivotally connected one end of a forwardly extending operating link 42, the other end of which is pivotally connected to an upstanding arm 43 rigidly carried by the transverse rock-shaft 27 journaled in the transverse supporting member 25 at the intermediate portion of the tractor body 10. The opposite end of the rock-shaft 27 carries a similar upstanding arm 44. A pair of laterally spaced, longitudinally extending operating links 45 are respectively connected to the arms 43 and 44 and to the upstanding rack structure 34 of the rake head 30. By this means, the operator on the tractor may raise and lower the front ends of the teeth of the rake head with respect to the pusher bars 29. The drawings illustrate in full lines the operating position of the rake head 30 and the corresponding position of the operating lever 41. Figure 2 shows in dotted lines the rearward position of the operating lever 41, which position is assumed by the lever when the rake head is tilted or moved to transport position. The disposition of the pivotal connections between the operating link 42 and the lever 41, designated at 46, and between the operating lever 41 and the bracket 40 on the axle housing 11, designated at 47, are such as to provide an over-center locking means for locking the rake head in transport position. It will be observed that this over-center position of the parts is broken or released when the lever 41 is moved forwardly, as shown in full lines, to lower the rake teeth. In this latter position of the parts the lifting and lowering mechanism does not interfere with tilting of the rake head, and the rake head is thus allowed to float about a horizontal axis within rather wide limits. The locked position of the lifting and lowering mechanism is effective only during raised or transport position of the rake head.

Another important feature of the invention is the means for resisting relative transverse movement between the rake head 30 and the tractor. As best shown in Figures 3 and 4, the rear bar or frame member 31 of the rake head 30 carries an upstanding member or standard 48. As illustrated here, this member takes the form of a bolt secured at its lower end by a nut 49 to the member or bar 31 and threaded at its upper end, as at 50. The front transverse supporting member 22 carries centrally thereof and preferably rigidly thereon a guide in the form of a U-shaped member 51. This member encircles the standard 48. Since the guide member 51 is carried by the transverse support 22 in a manner preventing relative transverse movement therebetween, and because the standard 48 passes vertically through the guide, relative transverse movement between the rake head 30 and the tractor is prevented. This means is located at a central part of the rake head and tractor construction and permits the elimination of complicated structure commonly employed to connect the pusher bars with the tractor body.

As previously stated, another important feature of the invention is the provision of means for applying pressure to the rake head, so that the rake teeth are urged into contact with the ground. In a specific aspect of the invention this means is incorporated with the means for resisting relative movement between the rake head and tractor. As shown in Figures 3 and 4, the pressure or yieldable means includes a coil spring 52, which encircles the standard 48 between the U-shaped guide member 51 and a nut 53 carried on the threaded end 50 of the standard. The compression of the spring is such as to move the rear end of the rake head vertically upwardly, and thus to move the forward ends of the rake teeth 33 downwardly into contact with the ground. As will be observed, the yieldable or pressure means just described is constructed and functions independently of the lifting and lowering mechanism. There is thus eliminated the effect that a particular adjustment of the lifting and lowering mechanism might have on the operation of the rake head. As previously stated, the lifting and lowering mechanism constructed according to the present invention is such as to permit substantial floating movement of the rake head. This movement is unrestrained except by the pressure means. It is obvious, of course, that the nut 53 may be adjusted on the standard 48 to vary the pressure on the spring 52 and that thereby the pressure on the rake teeth can be varied at will. Such adjustment remains constant and is not effected, as has been stated, by the lifting and lowering mechanism.

From the foregoing description it will be seen that an improved vehicle-mounted sweep rake has been provided and that the rake head is supported on the vehicle in a desirable manner, permitting efficient operation thereof. The centrally located means for resisting transverse movement simplifies the rake construction and eliminates complicated and expensive means heretofore employed. The pressure means functions independently of the lifting and lowering means and is admirably incorporated into the means for resisting transverse movement of the rake head with respect to the tractor. Certain other important features of the invention will be apparent to those versed in the art.

In the operation of the rake, the tractor is driven forwardly with the rake generally in the position shown in Figure 2, the pusher bars 29 normally resting on the ends of the transverse member 22, and the front ends of the rake teeth engaging the ground. When minor irregularities in ground contour are encountered by the rake teeth, the rake head 30 will, of course, pivot about its pivot pins 39 with respect to the pusher bars 29. This movement will be yieldably opposed by the resilient or pressure means 48—52. When the rake head encounters a larger variation in ground contour, as when the rear part of the head engages a rise or the tractor front truck 18 drops into a depression in the ground, the entire forward rake structure, including the rake head 30 and pusher bars 29, will move vertically with respect to the tractor about the pivotal connection 25—27 between the tractor and pusher bars. The pusher bars in that case will be temporarily unsupported on the end portions 23 of the transverse member 22. After the tractor and rake pass over such irregularities in the terrain, the parts will resume the positions previously taken, as shown in Figure 2. Thus, the rake head has vertical movement with respect to the pusher bars, and the rake and pusher bars have vertical movement with respect to the tractor. The pressure means permits comparatively free floating movement of the parts referred to.

It will be understood, of course, that only a preferred embodiment of the invention has been illustrated and described and that numerous modifications and alterations thereof may be made without departing from the spirit and scope of the invention as defined in the appended claims.

What is claimed is:

1. A vehicle-mounted sweep rake comprising, in combination, a vehicle having a longitudinal body, a rake head disposed ahead of the body, means connecting the rake head to the body to mount the rake for tilting upwardly or downwardly with respect to the body, means for tilting the rake head, and yieldable means connected between the rake head and the vehicle body independently of the tilting means to yieldably urge tilting of the rake head in one direction.

2. A tractor-mounted sweep rake comprising, in combination, a tractor having a longitudinal body, a member carried by and disposed transversely at the forward end of the body, a pair of generally longitudinally running pusher bars, one at each side of the body and extending forwardly past the transverse member, means connecting the bars to the tractor body rearwardly of the transverse member to mount said bars for movement vertically with respect to the body, said bars being adapted to engage the transverse member to limit their vertical movement in one direction, a rake head disposed ahead of the transverse member, means connecting the rake head to the front ends of the pusher bars to mount the rake head for tilting upwardly or downwardly, and yieldable means connected between the rake head and the transverse member to yieldably urge tilting of the rake head in one direction.

3. A tractor-mounted sweep rake comprising, in combination, a tractor, a rake head disposed ahead of the tractor, means connecting the rake head to the tractor for relative vertical movement, and means connected between the rake head and the tractor for resisting relative transverse movement between the rake head and the tractor and including a guide member carried by and disposed centrally of the tractor and means engaging the guide member and a central part of the rake head, said part of the rake head and the guide member having relative movement vertically.

4. A tractor-mounted sweep rake comprising, in combination, a tractor, a rake head disposed ahead of the tractor, means connecting the rake head to the tractor for relative vertical movement, means connected between the rake head and the tractor for resisting relative transverse movement between the rake head and the tractor and including a pair of relatively vertically slidable members disposed centrally of the tractor and rake head, means connecting one member to the rake head and means connecting the other member to the tractor, and yieldable means connected between said members to urge said members for relative vertical movement in one direction.

5. A tractor-mounted sweep rake comprising, in combination, a tractor, a rake head disposed ahead of the tractor, means mounting the rake head on the tractor for relative vertical movement, a vertical standard rigidly carried by the rake head, and a guide member carried by the tractor and loosely engaging the standard on the rake head to permit relative vertical movement and to limit relative lateral movement between the tractor and rake head.

6. A tractor-mounted sweep rake comprising, in combination, a tractor, a rake head disposed ahead of the tractor, means mounting the rake head on the tractor for relative vertical movement, a vertical standard rigidly carried by the rake head, a guide member carried by the tractor and loosely engaging the standard on the rake head to permit relative vertical movement between the tractor and rake head, and yieldable means engaged between the guide member and the standard for urging the rake head vertically in one direction.

7. A tractor-mounted sweep rake comprising, in combination, a tractor having a longitudinal body, supporting means at the front of the body including a horizontal transverse member extending at opposite ends beyond the sides of the body, a rake head disposed ahead of the supporting means, a pair of longitudinally extending pusher bars disposed respectively at opposite sides of the body and extending above and forwardly beyond the transverse member, means connecting the rear ends of the bars to the tractor rearwardly of the supporting means to mount the bars for movement vertically relative to the tractor body, said bars in lowermost position resting on and being supported by the transverse member, and means supporting the rake head on the front ends of the bars.

8. A tractor-mounted sweep rake comprising, in combination, a tractor having a longitudinal body carried on front and rear wheels, supporting means at the front of the body including a horizontal transverse member extending at opposite ends beyond the sides of the body and disposed generally in a horizontal plane passed through the front wheel axis, a rake head disposed ahead of the supporting means, a pair of longitudinally extending pusher bars disposed respectively at opposite sides of the body and extending above and forwardly beyond the transverse member, means connecting the rear ends of the bars to the tractor rearwardly of the supporting means to mount the bars for movement vertically relative to the tractor body, said bars in lowermost position resting on and being supported by the transverse member. and means supporting the rake head on the front ends of the bars for pivoting the rake head on a transverse axis disposed at a level above the transverse member.

9. A tractor-mounted sweep rake comprising, in combination, a tractor having a longitudinal body, a pair of forwardly and downwardly extending supports carried respectively at opposite sides of the front end of the body, a transverse beam carried by the supports and having opposite end portions respectively projecting beyond opposite sides of the body, pusher bars at each side of the body and extending above and forwardly beyond the end portions of the beam and adapted to be supported on the beam, means connecting the bars to the tractor body rearwardly of the beam to mount the bars for vertical movement limited downwardly by engagement between the bars and the projecting end portions of the beam, a rake head disposed ahead of the beam, means tiltably mounting the rake head on the bars, and means for resisting relative transverse movement between the tractor and rake head including a member connected directly to the rake head and to the beam at the portion of the latter between the aforesaid supports.

10. A tractor-mounted sweep rake comprising, in combination, a tractor having a longitudinal body, forwardly and downwardly extending supporting means carried centrally of the front end of the body, a transverse beam carried by the supporting means and having opposite end portions respectively projecting at opposite sides of the body, a rake frame including transversely spaced frame members extending above and forwardly beyond the end portions of the beam and adapted to be supported on the beam, means connecting the frame to the tractor body rearwardly of the beam to mount the frame for vertical movement limited downwardly by engagement between the frame and the projecting end portions of the beam, said rake frame including a rake head disposed ahead of the beam, means tiltably mounting the rake head on the frame members, and means for resisting relative transverse movement between the tractor and rake frame including a member connected to the rake frame and to the beam.

11. A tractor-mounted sweep rake comprising, in combination, a tractor having a longitudinal body, a pair of forwardly and downwardly extending supports carried respectively at opposite sides of the front end of the body, a transverse beam carried by the supports and having opposite end portions respectively projecting beyond opposite sides of the body, pusher bars at each side of the body and extending above and forwardly beyond the end portions of the beam and adapted to be supported on the beam, means connecting the bars to the tractor body rearwardly of the beam to mount the bars for vertical movement limited downwardly by engagement between the bars and the projecting end portions of the beam, a rake head disposed ahead of the beam, means tiltably mounting the rake head on the bars, means for resisting relative transverse movement between the tractor and rake head including a member rigidly carried by the rake head and extending adjacent the central portion of the beam between the aforesaid supports, and a guide member carried by said portion and engaging the member on the rake to permit relative vertical movement and to limit relative transverse movement of said member and rake head.

12. A vehicle-mounted sweep rake comprising, in combination, a vehicle having a body, a rake head disposed at one end of the vehicle and including rake teeth, means mounting the rake head on the vehicle body for vertical movement with respect to the vehicle through a range from a lowered ground-engaging position to a raised position, means carried by the vehicle body and operatively connected to the rake head for raising and lowering said rake head, yieldable means connecting the vehicle body and rake head independently of the raising and lowering means for yieldably urging the teeth of the rake head downwardly in ground-engaging position, and means for locking said rake head only in its raised position, whereby the rake head in ground-engaging position is unrestrained except by the yieldable means against vertical movement relative to the vehicle as the rake head follows varying ground contour.

SAMUEL E. HILBLOM.